UNITED STATES PATENT OFFICE.

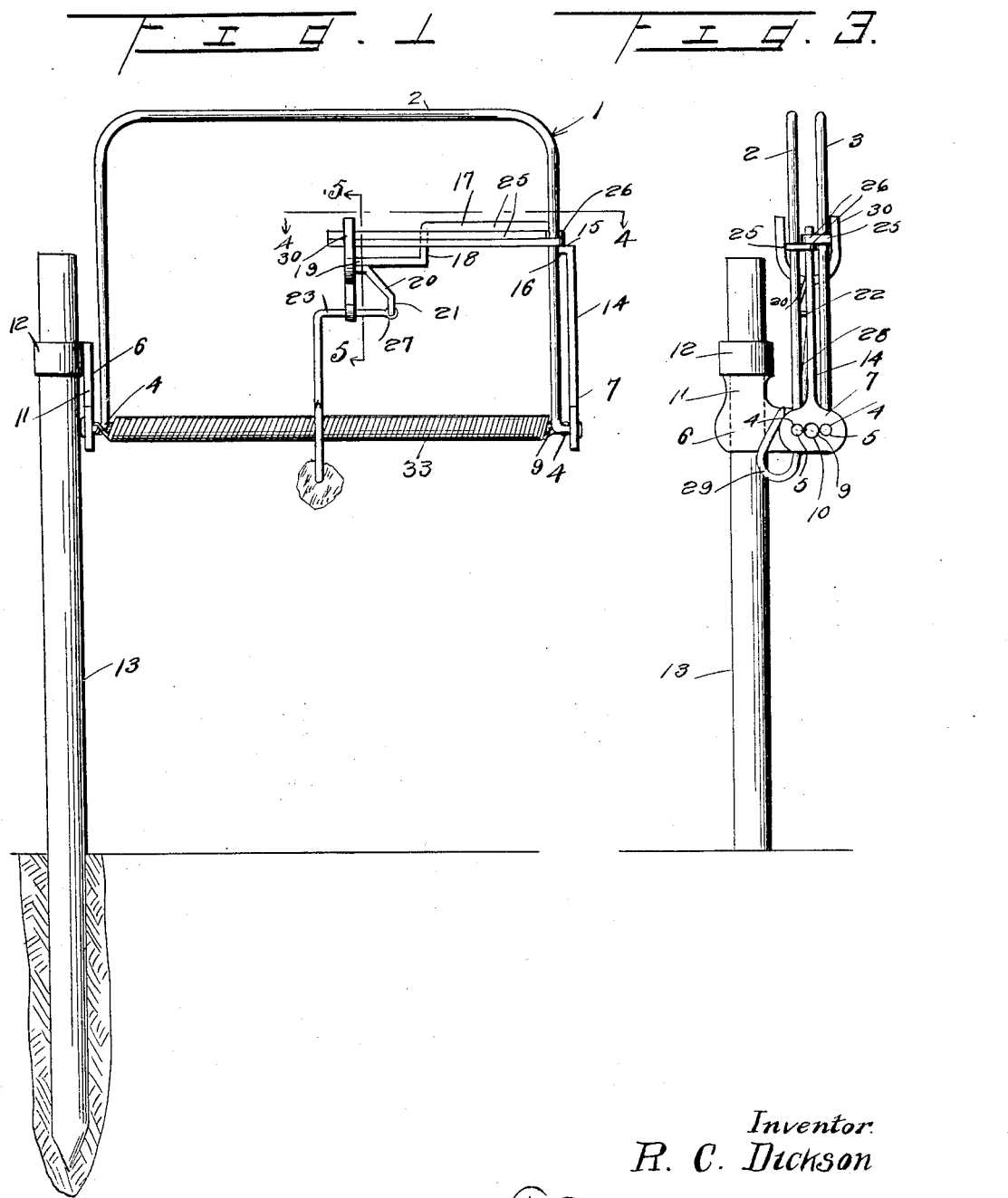

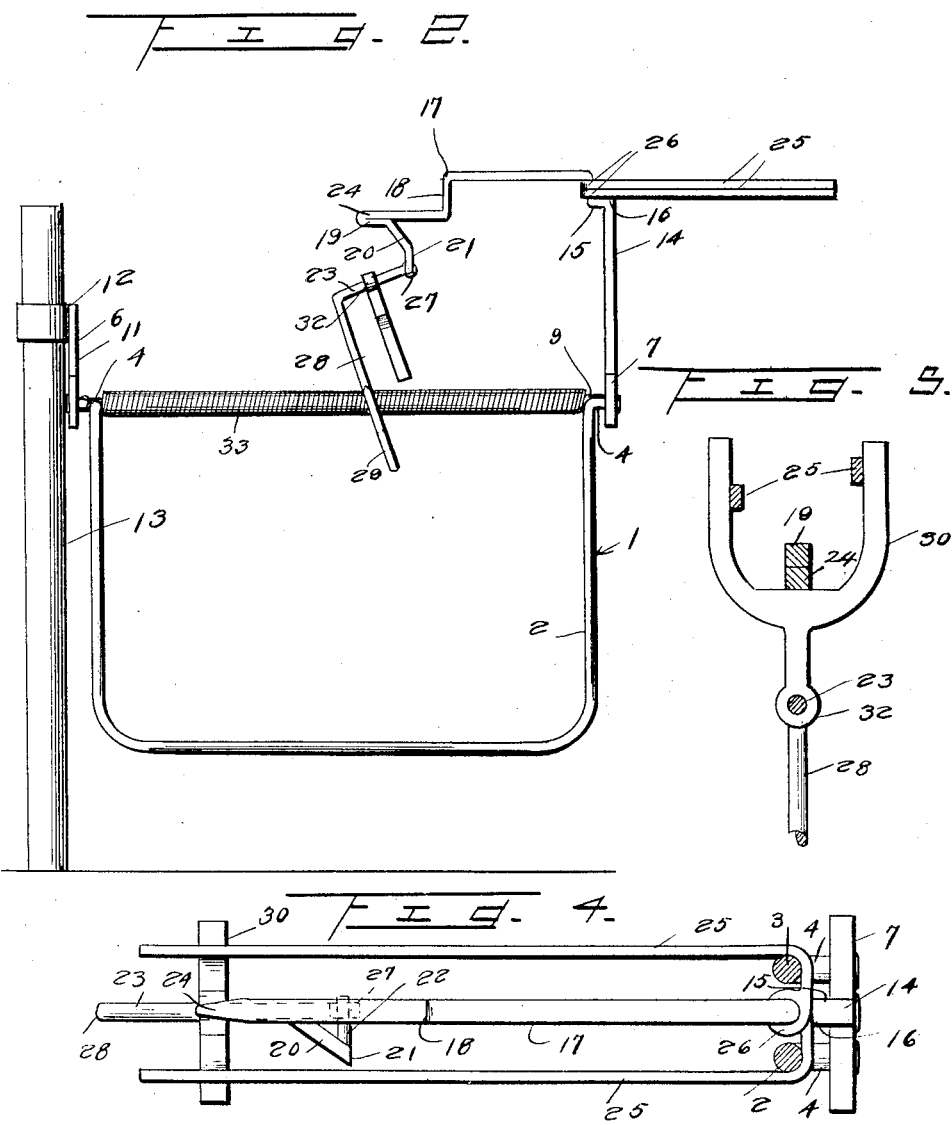

ROBERT C. DICKSON, OF COPELAND, ALABAMA.

ANIMAL-TRAP.

1,331,324.  Specification of Letters Patent.  Patented Feb. 17, 1920.

Application filed July 16, 1919. Serial No. 311,245.

*To all whom it may concern:*

Be it known that I, ROBERT C. DICKSON, a citizen of the United States, residing at Copeland, in the county of Washington and State of Alabama, have invented certain new and useful Improvements in Animal-Traps; and I do hereby declare the following to be a full, clear, and exact description of the invention, such as will enable others skilled in the art to which it appertains to make and use the same.

This invention relates to animal traps and the primary object of the invention is to provide an improved trap suspended above the ground and operated by animals coming under the same so that the jaws of the trap when released will engage the head or neck of the animal and kill the same instantly.

Another object of the invention is to provide an improved trap of the above character having an improved means for holding the jaws in set position and an improved means for simultaneously releasing the jaws.

A further object of the invention is to provide an improved means for supporting the trap in a suspended position, so that the same may be readily hung over the pathway of animals and positioned in lakes and creeks, and in regions where snow abounds.

A still further object of the invention is to provide an improved trap of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof in which:

Figure 1 is a front elevation of the improved trap, showing the same in set position, Fig. 2 is a similar view showing the trap in sprung position, Fig. 3 is an edge elevation of the trap showing the same in set position, Fig. 4 is an enlarged horizontal section taken on the line 4—4 of Fig. 1, Fig. 5 is a detail vertical section taken on the line 5—5 of Fig. 1.

Referring to the drawings in detail, wherein similar reference characters designate corresponding parts throughout the several views, the numeral 1 generally indicates the improved trap, which includes substantially U-shaped jaws 2 and 3 having the terminals thereof bent outwardly in opposite directions to form bearings 4 which are rotatably mounted in spaced apertures 5, formed in the end plates 6 and 7 which form the base of the trap. The end plates 6 and 7 are rigidly connected together, by a central supporting bar 9, the terminals of which are inserted in an opening 10 formed in the end plates which is arranged intermediate the openings which receive the terminals of the jaws 2 and 3 and the ends of the bar 9 are upset so as to effectively prevent the displacement thereof.

The end plate 6 is provided with the upwardly extending extension 11, having the ring shaped member 12 formed on the upper end thereof, by means of which the trap is adapted to be positioned on a supporting stake 13 which is adapted to be driven into the ground or the bed of a creek, lake or the like. The ring 12 is adapted to be placed over the upper end of the stake and then brought down into operative position, and the weight of the trap will be on the ring and thus frictionally bind the same into engagement with the stake. However, it is to be understood that the same can be positively secured to the stake by means of suitable fastening elements, not shown. The opposite end plate 7 is provided with an upwardly extending rounded extension 14, which is positioned intermediate the jaws 2 and 3 and this reduced rounded extension is provided with an offset portion 15 forming a shoulder 16, and is then provided with an inwardly extending horizontally arranged portion 17, having the inner end thereof bent downwardly as at 18 and then forwardly in a horizontal plane. The same is then bent back upon itself, as at 19, and laterally and downwardly at an incline, as at 20, and downward, as at 21, and then back laterally in a horizontal plane as at 22, which is positioned directly below the portion 18. The free terminal 22 forms a bearing for the trigger 23, which will hereinafter be more fully described. The portion 19 is flattened to form a nose 24, the purpose of which will be hereinafter more fully described. Rotatably mounted on the offset portion 15, is a pair of arms 25, which extend outwardly from the offset portion and then inwardly toward the center of the trap, and each of the arms 25 is adapted to engage one of the jaws 2 and 3, when the same are in their set position. The outer ends of the arms 25 are provided with eyes 26 for receiving the offset portion and the shoulder 16 prevents the downward movement of the arms on the offset portion. The inner end of the trigger is provided with an eye 27 which is rotatably mounted on the bearing 22 and the same extends inwardly toward the stake 13 and is then bent downwardly at right angles, as at 28, and is provided with a hook 29, whereby suitable bait may be readily secured to the same. A fork-shaped latch member 30 is mounted on the horizontally disposed portion of the trigger 23 intermediate the ends thereof, and the lower end of the fork-shaped member is provided with an eye 32, so as to permit the same to swing laterally on the trigger, for a purpose which will hereinafter more fully appear.

In setting the trap, the jaws 2 and 3 are brought into position, as shown in Fig. 1, against the tension of the spring 33 which is coiled around the rod 9, and the opposite terminal of the spring engages the jaws 2 and 3, so as to normally swing the same on the plates 6 and 7 and into engagement with each other below the plates. When the jaws 2 and 3 have been brought into the position as shown in Fig. 1, the arms 25 are swung on their pivots 26 and brought into engagement with each of the jaws 2 and 3 and the trigger 23 is raised carrying the fork-shaped latch member therewith and the free ends of the arms 25 are inserted into the fork-shaped member and the tension of the spring acting against the jaws 2 and 3 will normally hold the same in engagement with the arms of the fork-shaped member and prevent movement thereof and thus effectively hold the jaws against movement in set position. As clearly shown in Fig. 1, the fork-shaped member is brought over the nose 24, which effectively prevents the fork-shaped member from swinging on the trigger, when the same is in set position.

As soon as the trigger is pulled downward by an animal and swung on its pivot, the fork-shaped member is swung forwardly and away from and out of engagement with the free ends of the arms 25, which permits the same to be swung on their pivots and thus allow the jaws 2 and 3 to be brought into engagement with each other. It can be seen that if the arms 25 are of different lengths, they will be released simultaneously in spite of this fact, as the fork-shaped member is free to swing on its pivot as soon as the same is moved off of the nose 24.

From the foregoing description it can be seen that an improved trap is provided which can be readily set and held in suspended position so as to effectively catch and hold an animal upright in the same.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

1. An animal trap comprising a supporting structure, a pair of jaws pivotally connected with said supporting structure, an upwardly extending extension formed on said supporting structure and having an inwardly extending arm, a trigger carried by said arm, a pair of arms pivotally carried by said extension and arranged to engage the jaws when the jaws are in their set position, and means carried by said trigger for detachably engaging the free end portions of said arms.

2. An animal trap comprising a pair of end plates, means rigidly connecting the end plates together, a ring formed on one of said end plates for permitting the trap to be held in suspended position, a pair of jaws pivotally secured to said end plates, an upwardly extending extension formed on said end plate opposite to the plate having the ring formed thereon, said extension having an inwardly extending arm, a trigger carried by said arm, a pair of arms pivotally carried by said extension and arranged to engage the jaws when the same are in their set position, and means carried by said trigger for detachably engaging the free terminals of said arms.

3. In a trap of the class described, a pair of end plates, jaws pivotally secured to the end plates, a support formed on one of the end plates, an inwardly extending arm formed on said support, downwardly and laterally extending extensions formed on said arm, a trigger pivotally secured to said entensions, a pair of arms pivotally mounted on said support and arranged in a horizontal plane, said arms being adapted to engage the jaws when the same are in their set position, a forked member carried by said trigger and arranged to engage the terminals of said arms, as and for the purpose specified.

4. In a trap of the class described, a pair of end plates, a pair of U-shaped jaws rotatably mounted on the end plates, a bar rigidly connecting the end members, an upwardly extending support formed on one of the plates and arranged intermediate the jaws, an inwardly extending arm formed on the support, a downwardly and laterally extending extension formed on said arm, a trigger rotatably mounted on said extension, a bait hook formed on said trigger, a pair of arms rotatably mounted on said support and arranged to engage the outer surface of the jaws when the same are in their set position, a fork-shaped member pivotally carried by said trigger and arranged to engage the free terminals of said arms, said fork-shaped member being adapted to engage the extension formed on said support to prevent movement of the same in relation to the arms until the trigger has been actuated, as and for the purpose specified.

In testimony whereof I affix my signature in presence of two witnesses.

ROBERT C. DICKSON.

Witnesses:
   WILL BECTON,
   E. J. WOOD.